United States Patent

Molenaar et al.

[11] Patent Number: 5,938,002
[45] Date of Patent: Aug. 17, 1999

[54] DRY SHUFFLE FEED FOR PRODUCE

[75] Inventors: Martin W. Molenaar; Stefan F. Molenaar; David R. Laydon, Jr., all of Pueblo, Colo.

[73] Assignee: Atlas Pacific Engineering Company, Pueblo, Colo.

[21] Appl. No.: 08/844,242

[22] Filed: Apr. 18, 1997

[51] Int. Cl.[6] .................................................. B65G 25/00
[52] U.S. Cl. ........................................... 198/773; 198/445
[58] Field of Search ................................ 198/773, 774.1, 198/775, 774.3, 776, 445, 459.5

[56] References Cited

U.S. PATENT DOCUMENTS

| | | |
|---|---|---|
| 3,088,577 | 5/1963 | Chamberlin . |
| 3,151,729 | 10/1964 | Gardiner ............................. 198/773 X |
| 3,155,218 | 11/1964 | Creed ................................... 198/773 X |
| 3,478,862 | 11/1969 | Niederer ........................... 198/774.3 X |
| 3,651,925 | 3/1972 | Green .................................... 198/773 |
| 3,812,952 | 5/1974 | Jones et al. . |
| 3,923,143 | 12/1975 | Green ..................................... 198/773 |
| 4,020,943 | 5/1977 | Wood ...................................... 198/445 |
| 5,417,317 | 5/1995 | Kalinich ................................. 198/358 |
| 5,788,052 | 8/1998 | Spatafora ........................... 198/445 X |

FOREIGN PATENT DOCUMENTS

| | | | |
|---|---|---|---|
| 422072 | 3/1972 | Australia . | |
| 486670 | 6/1938 | United Kingdom ................... 198/773 |

OTHER PUBLICATIONS

ABL Hydrofeed Peeling System (1995).

Primary Examiner—James R. Bidwell
Attorney, Agent, or Firm—Bruce H. Johnsonbaugh

[57] ABSTRACT

A dry shuffle feed apparatus is provided for use with produce for feeding produce in a predetermined timing pattern to processing equipment. One or more shuffle conveyors, each having multiple flights, are provided having an infeed chute and return chute. Produce enters the infeed chute and is fed onto the conveyor, the infeed chute having a multi-angulated surface to prevent bridging of the produce. A return chute extends upwardly alongside the conveyor from the infeed chute and returns excess produce to the infeed chute. The flights on each shuffle conveyor become narrower nearer the output end of the conveyor and overfed produce falls off the conveyor onto the return chute.

11 Claims, 7 Drawing Sheets

DRY SHUFFLE FEED FOR PRODUCE

BACKGROUND AND BRIEF SUMMARY OF INVENTION

This invention relates in general to a feeding mechanism used for produce to feed the produce into processing equipment for peeling, coring, seed celling, slicing and other related processing steps. More particularly, this invention provides a dry feed system, i.e., a feeding system that does not require the use of water tanks, troughs, pumps or other water handling apparatus, that operates in conjunction with a shuffle conveyor system.

It is known in the prior art to provide continuous dry feeding apparatus which is typically used with continuous feed processing equipment. An example of this type of apparatus is U.S. Pat. No. 5,417,317 dated May 23, 1995, which patent is owned by the assignee of this application. That patent teaches a continuous chain conveyor wherein apples are fed onto the chain conveyor from one side of the conveyor. The apparatus taught in U.S. Pat. No. 5,417,317 is a waterless feed apparatus but is of a continuous nature and is used best with continuous feed processing equipment.

It is also known in the prior art to use a shuffle or "shufflo" system which provides a stepping type of feed action through a plurality of flights. These stepping type of conveyors lend themselves to operation with batch feed type of processing equipment, wherein a given number of apples or other types of produce need to be delivered into the processing equipment simultaneously and repetitively. However, the prior art shufflo or shuffle-type feed systems, of which applicants are aware, do not provide a dry feed system working together with a return chute for overfed produce to provide a predetermined number of produce items each cycle. The prior art shuffle conveyor flights are typically very wide, usually the width of the feeding machine. Some prior art shuffle feed systems require the use of water tanks and water handling apparatus, which greatly increases the cost and operating space for the system. Attempts have been made to utilize a shuffle-type or "shuffle" feed mechanism without the use of water tanks or water troughs, but those attempts have failed because of the tendency of apples and other produce to form "bridges" on the conveyor which block the operation of the conveyor. These "bridges" must be removed by hand. By the word "bridging," we mean that a group of apples or other produce will form an archway typically at the input end of the shuffle conveyor, which prevents the conveyor from moving apples or other pieces of produce upwardly along the flights to the top or output of the conveyor.

According to the present invention, a dry or waterless feed system for delivering a predetermined number of pieces of produce per cycle is provided utilizing one or more shuffle conveyors, avoids bridging and is compatible with batch feed processing equipment. For example, if it is desired to feed two apples simultaneously into a batch fed apple processing machine for peeling, coring, seed celling and slicing the apples, two of the shuffle conveyors according to the present invention may be positioned parallel and adjacent to each other and synchronized to provide two apples simultaneously at their output ends for each cycle of the conveyor stepping action. Alternatively, a single conveyor could be utilized wherein the flights are designed to deliver two apples per cycle.

A primary object of the invention is to provide a dry shuffle feed mechanism for produce which is capable of feeding a predetermined number of produce items into batch fed produce processing equipment simultaneously and repetitively.

A further object of the invention is to provide a dry feed apparatus, i.e., one not requiring water tanks or water handling apparatus, utilizing one or more shuffle conveyors and which avoids the problem of "bridging."

Another object of the invention is to provide a dry feed apparatus for produce for use with batch fed processing equipment wherein the feed mechanism occupies a minimum amount of floor space.

Another object of the invention is to provide a dry feed apparatus capable of use in conjunction with round shaped produce such as apples and oranges and which also may be used with elongated shaped produce such as pears, mangoes, elongated apples, cucumbers, avocados and kiwi fruit.

Another object of the invention is to provide a dry feed mechanism capable of handling a wider size range of produce than the dry feed apparatus of the prior art.

Other objects and advantages of the invention will become apparent from the following description and drawings wherein:

DETAILED DESCRIPTION OF THE DRAWINGS

Figure 1:
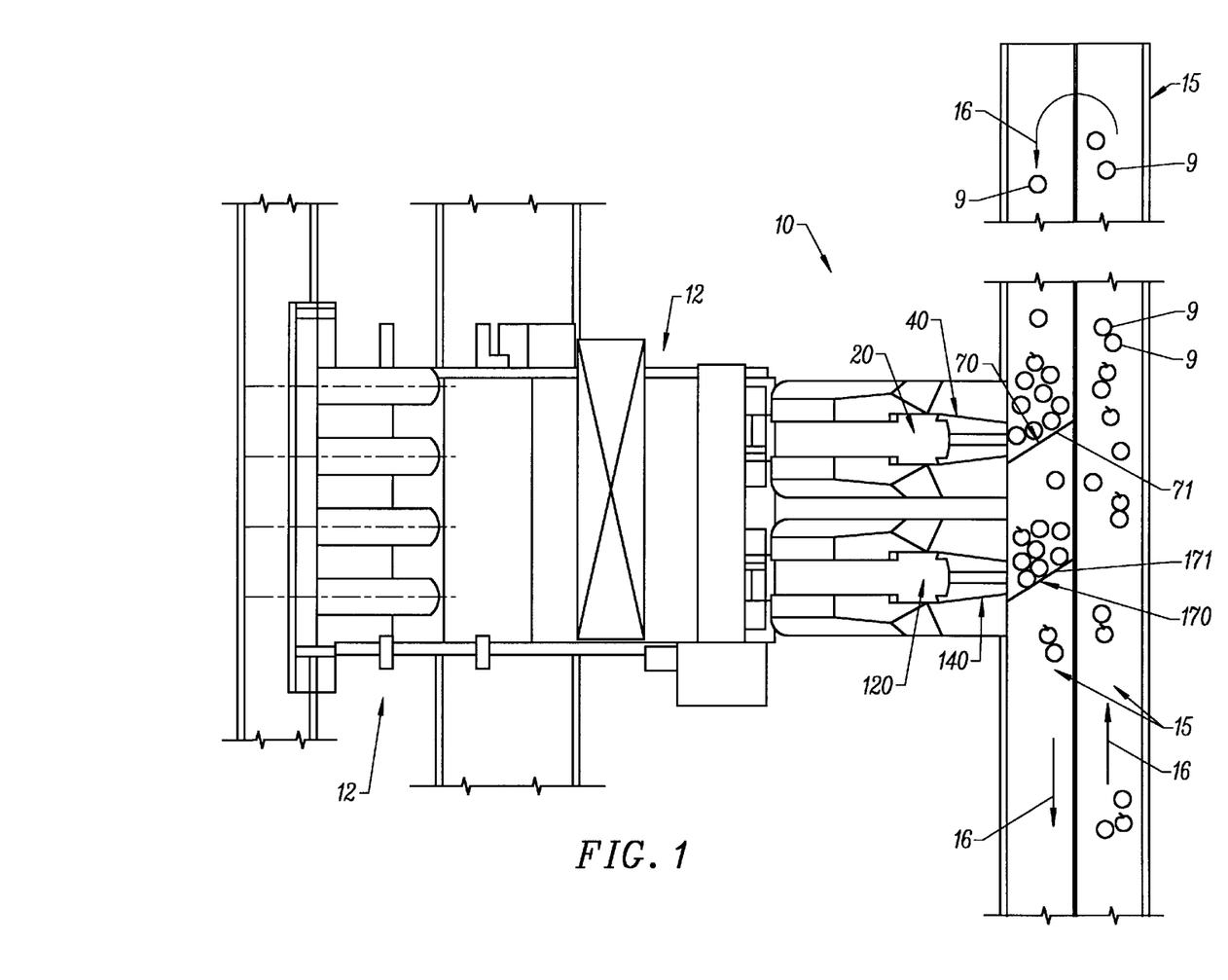
FIG. 1 is a plan view of the dry feed mechanism according to the present invention.

Referring to FIG. 1, a dry feed apparatus shown generally as 10 is positioned adjacent a batch type of produce processing equipment shown generally as 12. A supply source of produce is shown generally as 15 and provides a constant supply of produce to the dry feed apparatus 10 of the present invention. FIG. 1 shows a plurality of apples 9 being supplied to the feed apparatus 10. However, it is to be understood that, although the preferred embodiment shown in the drawings has been designed specifically for operation with apples and other round shaped produce, the present invention is capable of use with elongated shaped produce such as pears, mangoes, elongated apples, cucumbers, avocados, kiwi fruit and similarly shaped items. The present invention relates to the feed mechanism 10 and may be used with a variety of prior art produce processing equipment, such as shown as 12 in FIG. 1. Similarly, various types of supply sources may be utilized with the feed apparatus 10 of the present invention. The preferred continuous supply source shown in FIG. 1 is a merry-go-round conveyor moving the apples in the direction of arrows 16.

Figure 2:
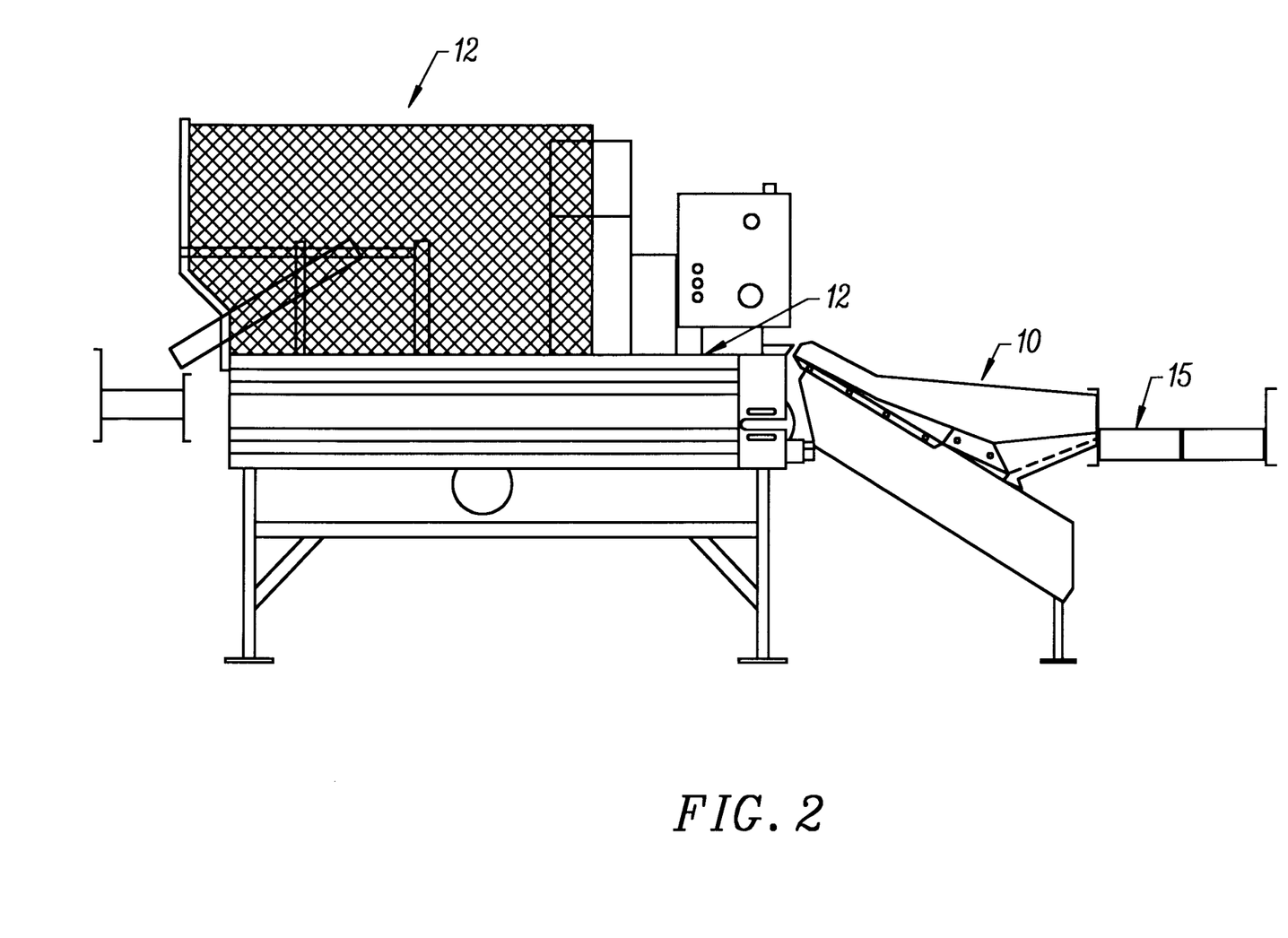
FIG. 2 is a side elevation view of the dry feed mechanism according to the present invention.

FIG. 2 is a side elevational view showing the supply source 15, the dry feed apparatus of the present invention 10 and a batch type of apple processing equipment generally as 12.

Figure 3:
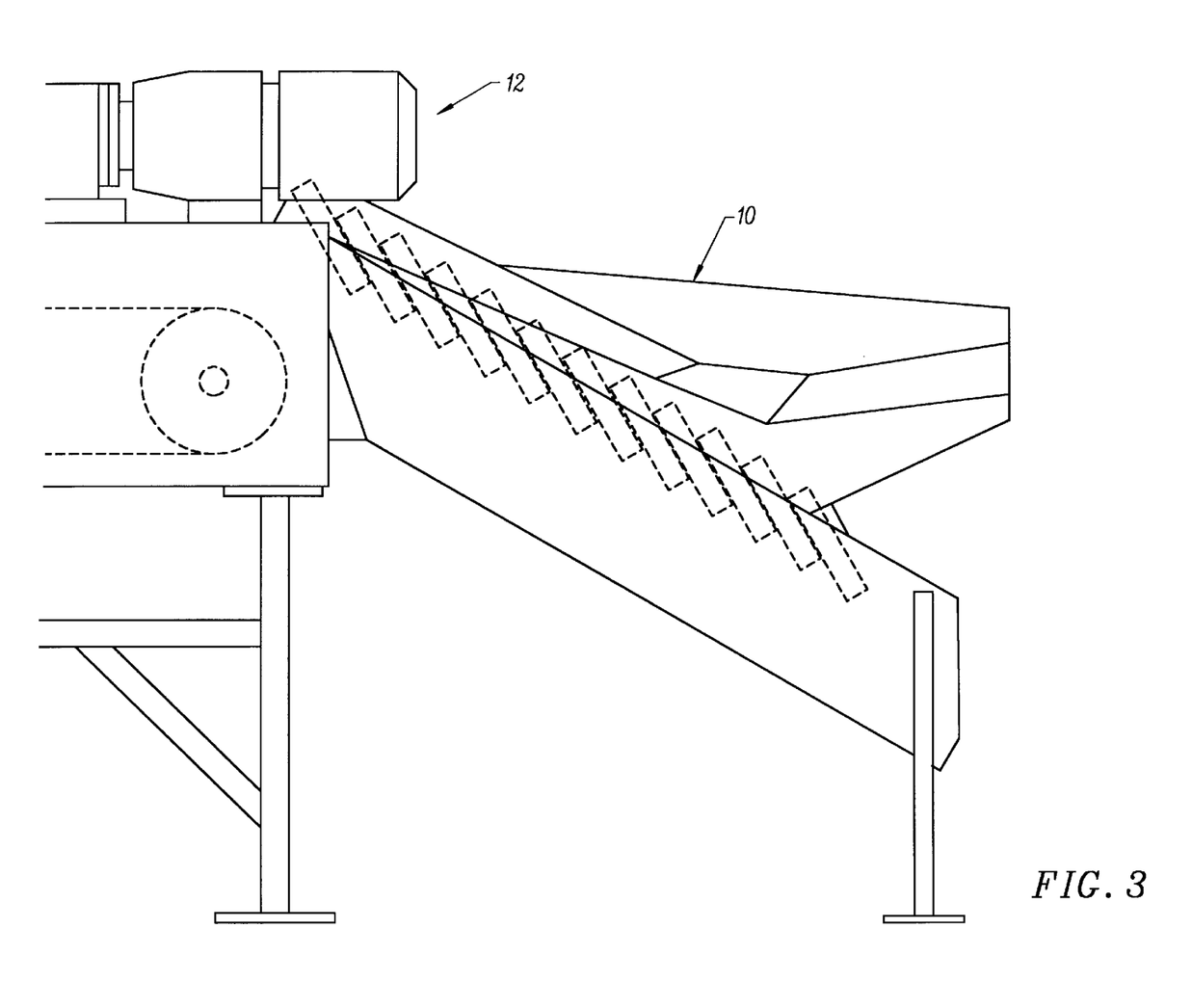
FIG. 3 is a side elevational view in section showing portions of the dry feed mechanism according to the present invention.

FIG. 3 shows a sectional view of the dry feed apparatus 10 and the apple processing equipment 12 of FIG. 2.

Figure 4A:
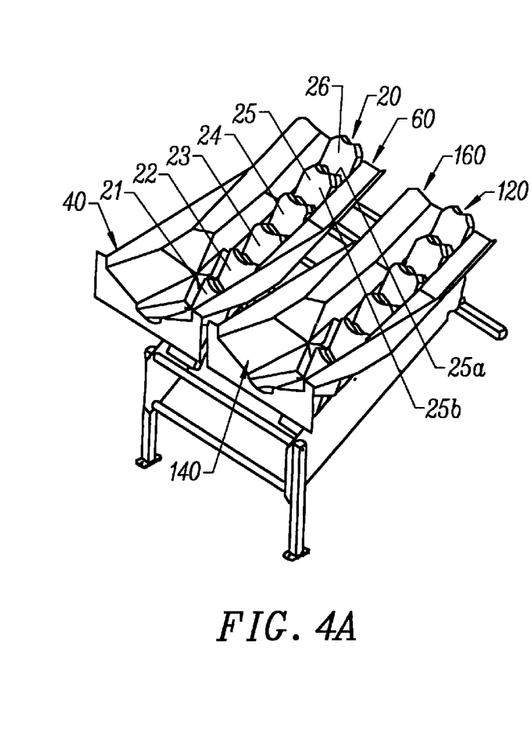
FIGS. 4A, 4B and 4C are perspective views of one embodiment of the invention showing two shuffle feed conveyors at three different points in their cycle of operation.
Figure 4B:
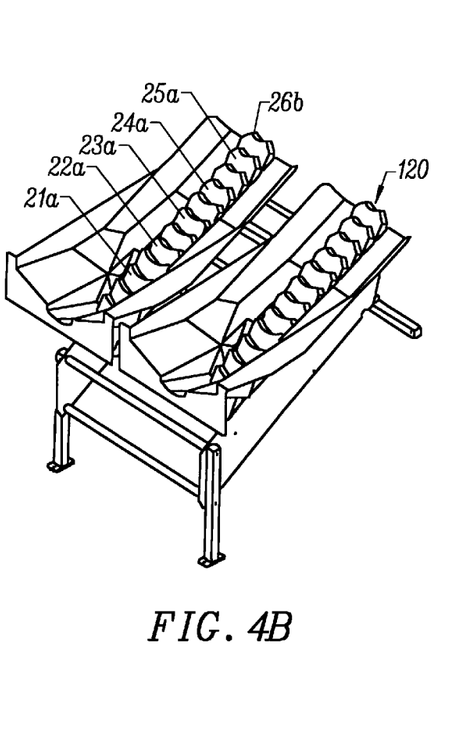
Figure 4C:
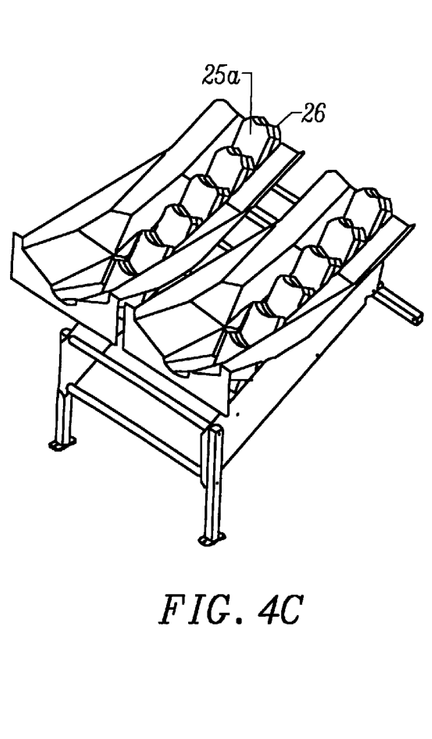

FIGS. 4A, 4B and 4C show key portions of the dry feed apparatus of the present invention separated from the supply source 15 and the processing equipment 12 shown in FIGS. 1–3. FIGS. 4A–4C show two shuffle conveyor means 20 and 120, both of which are identical in construction. Shuffle conveyor means 20 will be described in detail with the understanding that the identical parts are contained in the second shuffle conveyor means 120 as well. It should also be understood that X shuffle conveyors may be arranged to deliver output simultaneously, and Y conveyors may be positioned parallel to each other. Shuffle means 20 has a plurality of six flights 21–26. Flight 21 is the lowermost or first flight and forms the input end of shuffle conveyor means 20. The uppermost and last flight is flight 26 and, when an apple reaches flight 26 and drops off the upper end of flight 26, it drops into processing equipment 12. Upper flight 26 forms the output end of conveyor means 20. The longitudinal axis of shuffle conveyor means 20 is described by a line that runs from the top center of first flight 21 along the center of the tops of flights 22–25 and across the top center of flight 26.

Each of the flights 21–26 has a lower movable member such as member 25a and an upper stationary member such as 25b, except that upper flight 26 has only one single stationary member 26b. The remaining flights do not have their separate members numbered for purposes of clarity. In operation, each of the lower flight members such as member 25a moves upwardly and forwardly to the intermediate position shown in FIG. 4B and to its final position shown in FIG. 4C where the upper edge of movable member 25a is aligned with the upper edge of flight 26. During each cycle of the shuffle conveyor, each of the upper members 21a–25a moves together in unison and, at the end of each cycle, each of those members has advanced an apple upwardly to the next flight. The flights of conveyors 20 and 120 are synchronized so that apples are simultaneously and repetitively discharged from both conveyor output ends into the batch fed processing equipment 12.

In the preferred design shown in FIGS. 4A–4C, the upper surface of the lower flight 21 is wider than the upper surface of flight 25. By having the surfaces of the flights become narrower towards the output end of the shuffle conveyor 20, more efficient singulation of apples or other produce is achieved. Excess apples picked up by the wider lower flight 21 fall off the shuffle conveyor into return chute means 60. It is to be noted that the flights can be designed to convey two or more pieces of produce, n pieces in the generalized sense, but the embodiment shown in the drawings conveys a single apple to the output end of shuffle conveyor 20 and a single apple to the output end of conveyor 120 simultaneously and repetitively with each cycle of the shuffle conveyor.

An infeed chute means 40 is located adjacent the input end formed by the lowermost flight 21 of conveyor 20 for temporarily holding and feeding produce such as apples by gravity onto the shuffle conveyor 20. An identical infeed chute means 140 is provided adjacent shuffle conveyor means 120. For clarity and brevity, only infeed chute means 40 will be described in detail.

A return chute means shown generally as 60 in FIGS. 4A–4C extends upwardly from infeed chute means 40 and the return chute 60 extends alongside shuffle conveyor 20 and has a multi-angulated surface to prevent bridging.

Figure 5:
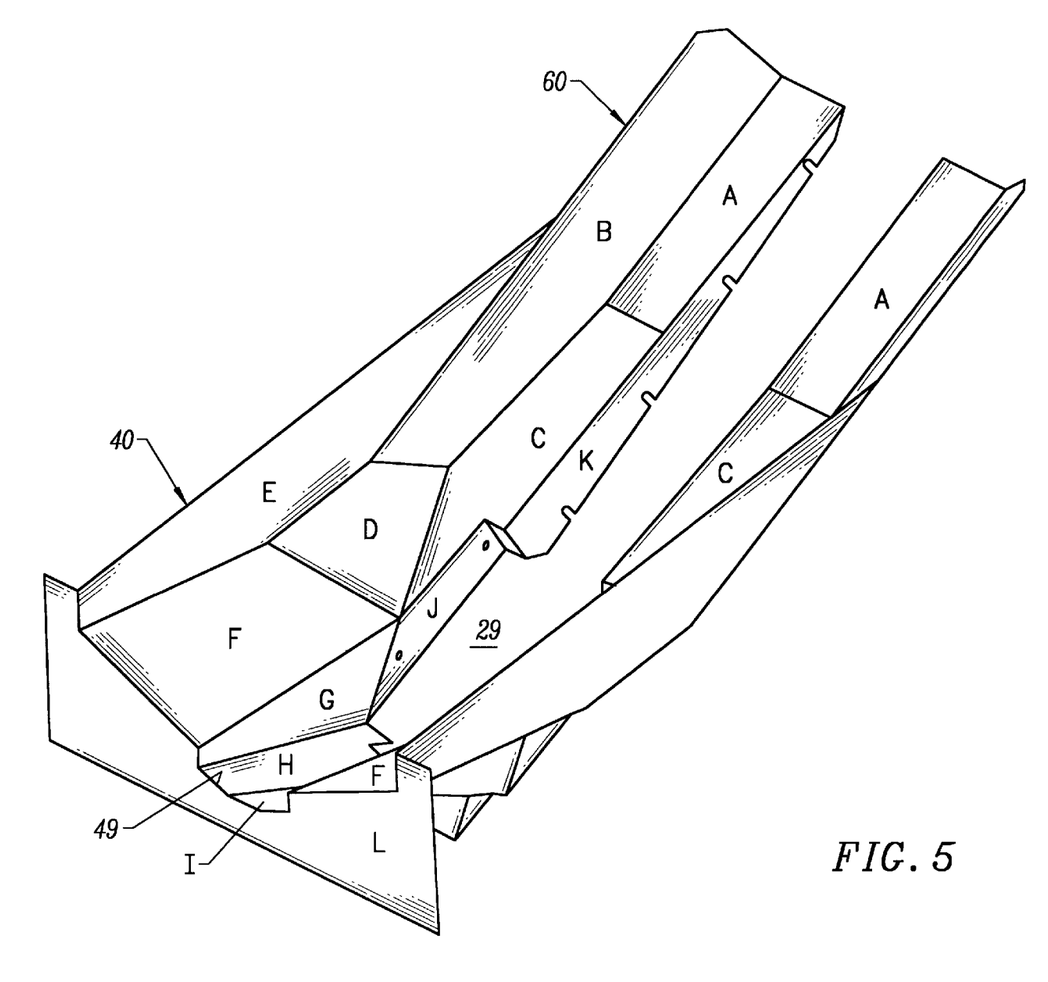
FIG. 5 is a perspective view of the infeed chute and return chute of the present invention having multi-angulated surfaces which effectively prevent bridging.
Figure 7:
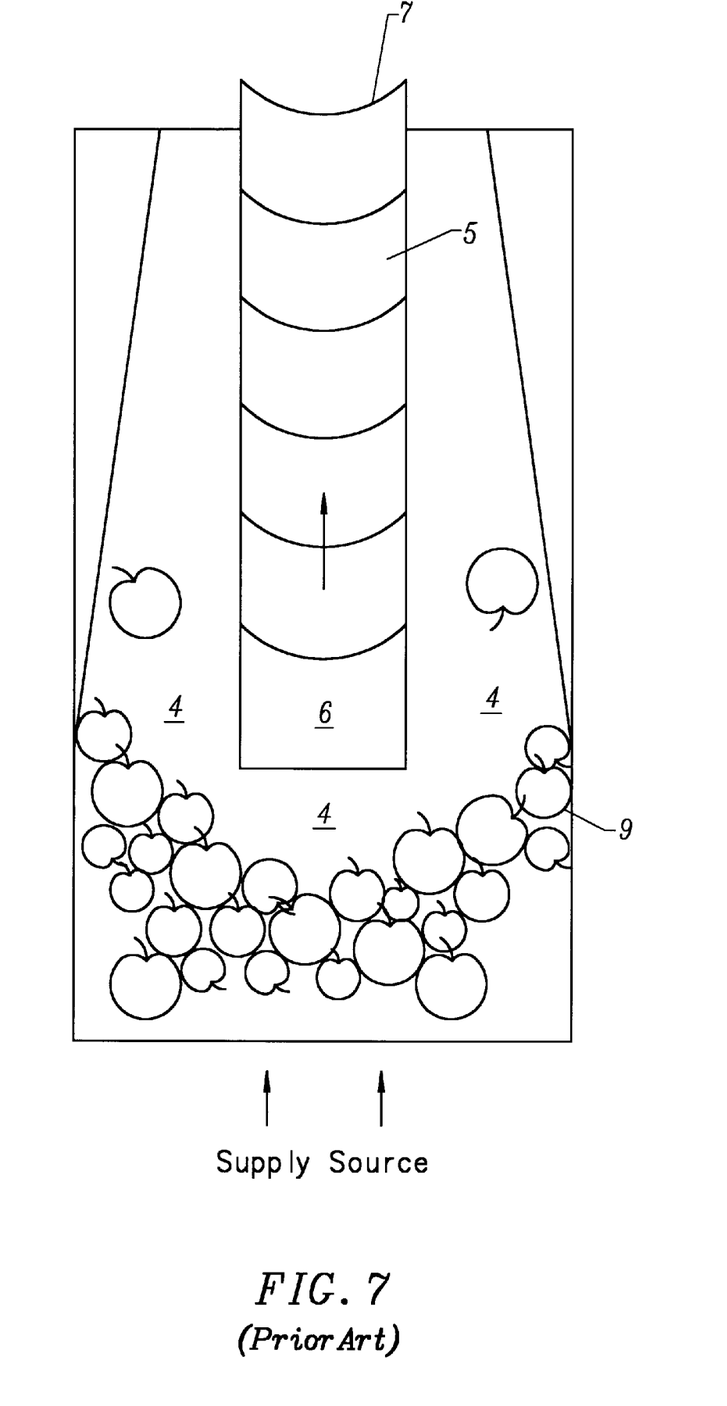
FIG. 7 is a schematic representation of the "bridging" phenomenon observed on prior art shuffle conveyors.

The multi-angulated surfaces of infeed chute means 40 and return chute 60 are shown best in FIG. 5. FIG. 5 shows in perspective view the surfaces of chutes 40 and 60 with the shuffle conveyor mechanism not shown in the drawing. Infeed chute means 40 has surfaces that extend upwardly and away from the input end 21 of shuffle conveyor 20. The input end is shown as reference numeral 21 in FIG. 5. The surfaces extending upwardly and away from input end 21 include the surfaces labeled F,G,H,I and portions of surfaces J, D and E. The purpose of forming those surfaces in a multi-angulated array is to prevent "bridging" of the apples as is shown best by the schematic representation of FIG. 7. FIG. 7 shows a prior art shuffle conveyor 5 having an input end 6 and an output end 7. The relatively flat surfaces 4 adjacent the input 6 of the shuffle conveyor allows the apples 9 to form a bridge as shown which effectively interrupts the flow of apples onto the shuffle conveyor 5 into the processing machinery (not shown). By forming the multi-angulated surface shown in FIG. 5 which extends upwardly and away from the input of conveyor 20, we have effectively eliminated the "bridging" problem because the apples do not have a relatively smooth and flat surface on which they can form the characteristic archway shown in FIG. 7.

In particular, we have found that, by forming a generally U-shaped depression 49 in the central portion of the infeed chute means 40 upstream of input 21, "bridging" is prevented. Apples that tend to form the central part of an archway such as shown in FIG. 7 simply drop downwardly into depression 49 onto surfaces H and I and no archway is formed. Also, because the surfaces F are sloped upwardly and away from input 21, it is very improbable for apples to begin to form an archway on surfaces F. It is preferable to utilize both a generally U-shaped depression 49 and multi-angulated surfaces sloping upwardly and away from input 21, although either of those features alone would reduce the "bridging" problem. The generally U-shaped depression 49 has an opening taper, i.e., the width of the depression increases as an apple in the depression nears the input end 21 of the conveyor; the opening taper prevents apples from becoming wedged in depression 49.

Similarly, return chute means 60 has a multi-angulated surface which includes surfaces A,B,C,K and portions of surfaces J, D and E. By having surfaces that extend upwardly and away from the shuffle conveyor 20, bridging is effectively prevented, although the bridging problem is most prevalent near the input end 21 of the conveyor. By having virtually all of the surfaces of the return chute means 60 at different angles extending upwardly and away from conveyor 20 and by having the surfaces nearer the conveyor means 20 at a lower elevation than surfaces further away from conveyor 20, we have effectively eliminated the bridging problem in the return chute 60.

Return chute means 60 cooperates with shuffle conveyor means 20 to singulate apples or other produce. For example, first flight 21 is wide enough to receive two apples, but top flight 26 is only wide enough to convey one apple. One of the two apples on flight 21 will fall off conveyor 20 onto return chute means 60. The remaining apple will become centered on upper flights 24 and 25 before reaching output flight 26. The excess apples roll downwardly on return chute means 60 toward input end 21 of conveyor 20. Apples on return chute means 60 have priority over apples in infeed chute means 40. This priority is achieved by feeding apples on return chute means 60 on top of apples in infeed chute means 40. If apples on return chute means 60 did not have priority, apples would accumulate on chute 60 and would negatively impact the singulation capability of conveyor 20. Excess apples at output end 26 should be avoided, since excess apples entering the processing equipment 12 become waste and may cause other apples to become wasted as well. If conveyor 20 were designed to deliver two apples at its output end 26, excess apples in return chute 60 would cause excess apples to reach the output end 26.

Referring to FIG. 1, diverter means 70 and 170 are provided which divert apples 9 from the supply source 15 into each infeed chute means 40 and 140. Diverter means 70 and 170 are identical. Diverter means 70 has a rod 71 which extends angularly across at least a portion of supply source 15. Rod 71, for example, is positioned slightly above the surface of supply conveyor 15, for example, by approximately ⅛ inch. Rod 71 will divert apples into infeed chute means 40 until infeed chute means 40 is full at which point apples 9 will simply bounce over rod 71 and move towards diverter means 170 and will fill infeed chute means 140 until that chute is full.

Figure 6:
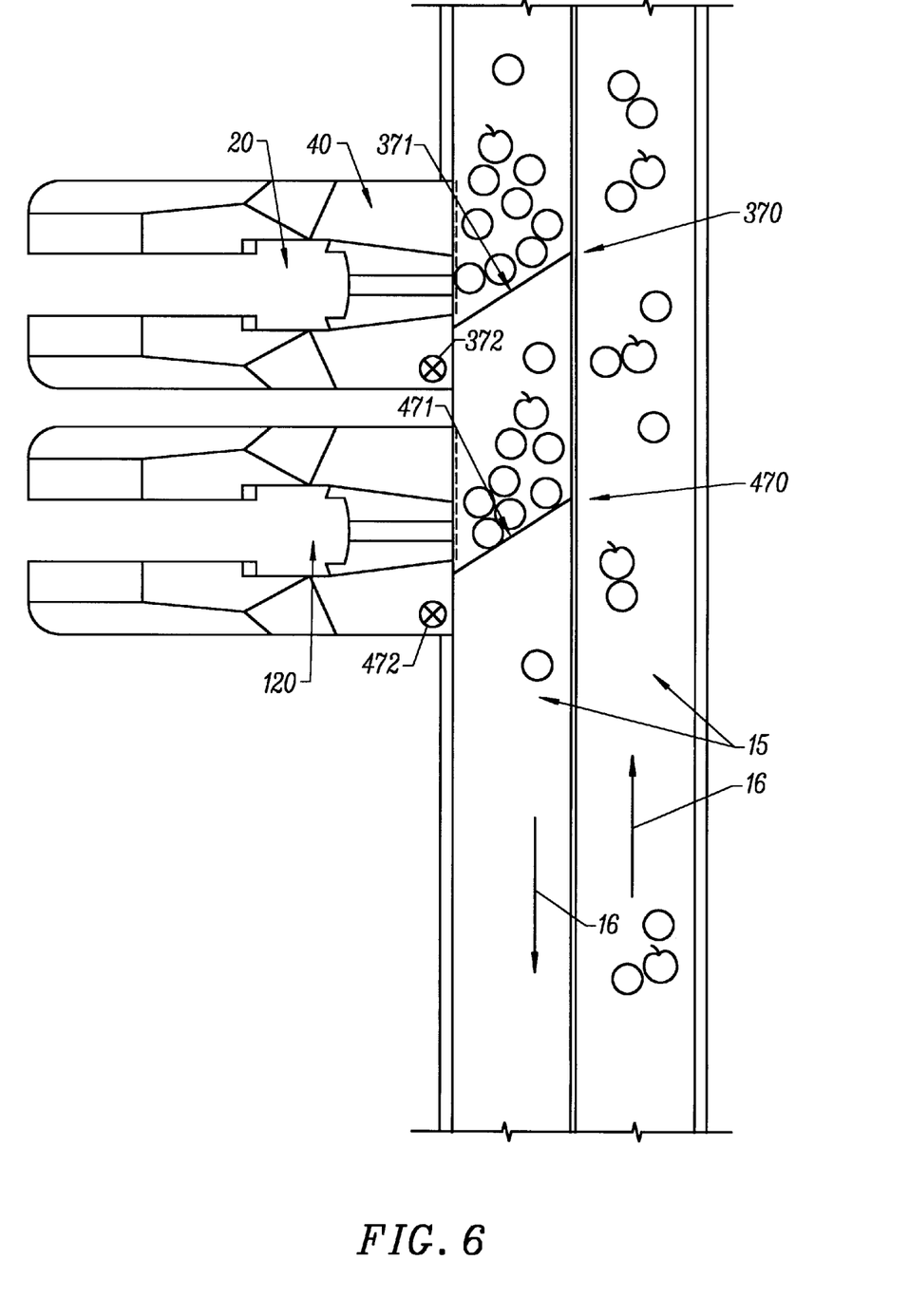
FIG. 6 is a schematic representation of an optional diverter which may be used with the invention.

An alternate type of diverter 370 can be utilized with the present invention and is shown schematically in FIG. 6. This diverter includes an optical sensor 372 and a gate 371 responsive to the optical sensor movable between a first position shown in FIG. 6 in which gate 371 causes produce to enter infeed chute means 40 and a second position shown in phantom in FIG. 6 wherein no produce enters infeed chute means 40. An actuator for the gate is provided (not shown) which moves the gate in response to sensor 382.

It is to be understood that changes may be made to the designs shown herein without departing from the spirit of this invention.

What is claimed is:

1. A dry shuffle feed apparatus for use with either round shaped or elongated shaped apples for receiving said apples from a continuous supply source and feeding multiple lines of singulated apples in a synchronized stepping action to batch feed processing equipment comprising:

X shuffle conveyor means, each having an input end and output end, and each having a longitudinal axis extending from said input end to said output end, each of said shuffle conveyor means having a plurality of flights operating with a synchronized stepping action to singulate and to advance apples to each of said X output ends simultaneously, and wherein the flights near said input end are wider than flights near said output end, X infeed chute means located adjacent said input end of each of said shuffle conveying means for temporarily holding said apples and for gravity feeding said apples onto said input end of said shuffle conveyor from both sides of said longitudinal axis, each said infeed chute means being aligned with the longitudinal axis of a shuffle conveyor means and having multi-angulated walls sloped upwardly and away from said input end of said shuffle conveyor means to prevent bridging of said apples, and X stationary return chute means, each extending upwardly from one of said infeed chute means alongside each shuffle conveyor means and which returns apples falling off said shuffle conveyor means to said infeed chute means.

2. The apparatus of claim 1 wherein each of said return chute means returns apples on top of apples in said infeed chute means.

3. The apparatus of claim 1 further comprising X diverter means for directing a portion of said apples from said continuous supply source to each of said infeed chute means.

4. A dry feed apparatus for use with either round shaped produce or elongated shaped produce for receiving said produce from a supply source and feeding said produce in a predetermined timing pattern to processing equipment comprising:

one or more shuffle conveyor means, each having an input end and output end, each of said shuffle conveyor means having a plurality of flights operating with a stepping action to advance n pieces of said produce on each of said flights to said output end, an infeed chute means located adjacent said input end of said shuffle conveying means for temporarily holding said produce and feeding said produce onto said shuffle conveyor means, said infeed chute means including a generally U-shaped depression between said supply source and said input end of said shuffle conveying means, said generally U-shaped depression being adapted to cause produce to drop downwardly into said depression, said infeed chute further comprising upwardly sloped surfaces extending outwardly from said generally U-shaped depression, whereby said upwardly sloped surfaces of said infeed chute means cooperate with said generally U-shaped depression to prevent bridging of said produce, and a stationary return chute means extending upwardly from said infeed chute means alongside each shuffle conveyor means.

5. The apparatus of claim 4 wherein said supply source comprises a supply conveyor and further comprising diverter means wherein said diverter means comprises a diverter rod that extends angularly across a portion of said supply conveyor and is positioned above said supply conveyor at a height which will divert produce until an infeed chute means is full, and which will allow produce to move over it after its respective infeed chute means is full.

6. The apparatus of claim 4 further comprising diverter means wherein said diverter means comprises a gate means positioned adjacent each infeed chute means and movable between a first position wherein produce flows into said infeed chute means from said supply source and a second position wherein flow into said infeed chute is blocked, sensor means for detecting the amount of produce in a specific infeed chute means and actuation means responsive to said sensor means for opening or closing said gate means in response to the amount of produce sensed in said specific infeed chute means.

7. The apparatus of claim 4 wherein each of said shuffle conveyor means has a plurality of flights wherein the flights near said input end are wider than flights at said output end.

8. A dry feed apparatus for use with either round shaped or elongated shaped apples for receiving said apples from a supply source and feeding said apples in a predetermined and repetitive batch pattern to processing equipment comprising:

X shuffle conveyor means, each having an input end and output end, and each having a longitudinal axis extending from said input end to said output end, each of said shuffle conveyor means having a plurality of flights operating with a synchronized stepping action to advance apples to a plurality of said output ends simultaneously, and wherein the flights near said input end are wider than flights near said output end, infeed chute means located adjacent said input end of each of said shuffle conveying means for temporarily holding said apples and feeding said apples onto said shuffle conveying means, each said infeed chute means being aligned with the longitudinal axis of a shuffle conveyor means and having a multi-angulated surface shaped to prevent bridging of said apples, and a stationary return chute means extending upwardly from each of said infeed chute means alongside each shuffle conveyor means.

9. The apparatus of claim 8 wherein said supply source comprises a supply conveyor and further comprising diverter means wherein said diverter means comprises a diverter rod that extends angularly across a portion of said supply conveyor and is positioned above said supply conveyor at a height which will divert apples until an infeed chute means is full, and which will allow apples to move over it after its respective infeed chute means is full.

10. The apparatus of claim 8 further comprising diverter means wherein said diverter means comprises a gate means positioned adjacent each infeed chute means and movable between a first position wherein apples flow into said infeed chute means from said supply source and a second position wherein flow into said infeed chute is blocked, sensor means for detecting the amount of apples in a specific infeed chute means and actuation means responsive to said sensor means for opening or closing said gate means in response to the amount of apples sensed in said specific infeed chute means.

11. The apparatus of claim 8 wherein said multi-angulated surface includes a generally U-shaped depression formed in said infeed chute means between said input end of said shuffle conveyor and said supply source.

\* \* \* \* \*

UNITED STATES PATENT AND TRADEMARK OFFICE
CERTIFICATE OF CORRECTION

PATENT NO. : 5,938,002
DATED : August 17, 1999
INVENTOR(S) : Martin W. Molenaar, et al It is certified that error appears in the above-identified patent and that said Letters Patent is hereby corrected as shown below:

In column 4, lines 4,5,6,24,29,33,37,44 and 59, change the reference numeral "21" to -- 29 --

In column 5, line 25, "382" should be -- 372 --

Signed and Sealed this

Fourth Day of January, 2000

Attest:

Attesting Officer

*Acting Commissioner of Patents and Trademarks*